United States Patent [19]

Frank et al.

[11] 4,177,837

[45] Dec. 11, 1979

[54] ACCUMULATOR

[75] Inventors: Earl E. Frank, Tallman, N.Y.; Bing S. Yee, Paramus, N.J.

[73] Assignee: Abex Corporation, New York, N.Y.

[21] Appl. No.: 798,319

[22] Filed: May 19, 1977

[51] Int. Cl.² ............................................. F16L 55/04
[52] U.S. Cl. ................................. 138/31; 277/188 A
[58] Field of Search ................... 138/31; 251/63, 324; 277/188 A

[56] References Cited

U.S. PATENT DOCUMENTS

| 2,715,419 | 8/1955  | Ford et al.     | 138/31    |
|-----------|---------|-----------------|-----------|
| 2,753,892 | 7/1956  | Deardorff et al.| 138/31    |
| 2,780,504 | 2/1957  | Russell         | 138/31    |
| 2,793,623 | 5/1957  | Ludwig et al.   | 277/188 A |
| 3,158,180 | 11/1964 | Greer           | 138/31    |
| 3,363,512 | 1/1968  | Ottestad        | 138/31 X  |
| 3,613,734 | 10/1971 | Elmer           | 138/31    |
| 3,863,677 | 2/1975  | Tarsha          | 138/31    |
| 4,040,600 | 8/1977  | Coppola et al.  | 251/63    |

*Primary Examiner*—Richard E. Aegerter
*Assistant Examiner*—James E. Bryant, III
*Attorney, Agent, or Firm*—Kinzer, Plyer, Dorn & McEachran

[57] ABSTRACT

An accumulator comprising a cylinder and piston in which the front end of the piston is characterized by two spherical zones separated by a chordal zone while the opposed end wall of the cylinder is concave having a slope substantially the same as said chordal zone; the piston seal is an elastomeric ring supported on each side.

3 Claims, 4 Drawing Figures

ACCUMULATOR

This invention relates to an accumulator.

There are some hydraulic systems in which the accumulator employed is subject to heavy demands resulting in considerable abuse on the accumulator piston and rapid wear of the piston seal, resulting in loss of pressure. Also, the environment may be one where it is difficult to keep the oil clean, meaning the piston may ride on abrasive particles which score the piston. The hydraulic system for a railroad car retarder disclosed in U.S. Pat. No. 3,926,124 (Earl E. Frank) is an example of a hydraulic system having such an accumulator.

The object of the present invention is to construct an accumulator piston and cylinder which will obviate the problems mentioned above.

IN THE DRAWING

Figure 1:
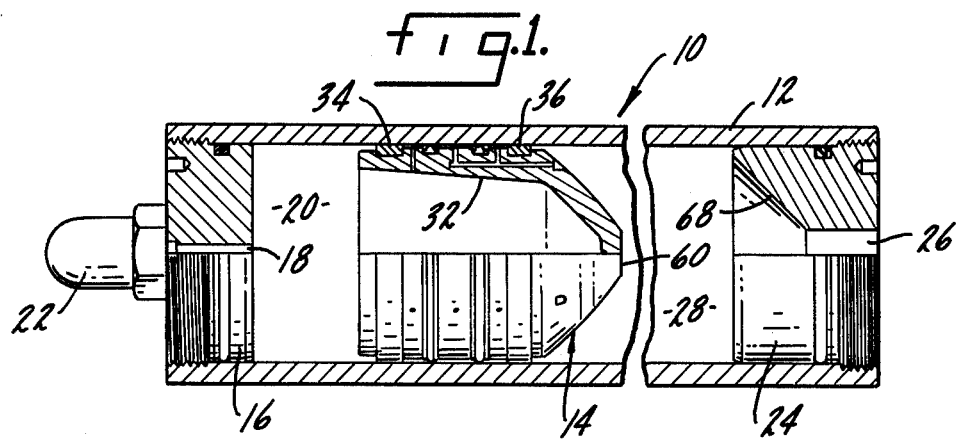
FIG. 1 is a half-section of an accumulator constructed in accordance with the present invention.

The accumulator 10, FIG. 1, comprises a cylinder 12 encompassing a piston 14. One end of the cylinder is provided with a head 16 having an opening 18 enabling pressurizing gas to be admitted to the cylinder chamber 20 behind the piston. Admittance of gas is controlled by a valve assembly 22.

The opposite end of the cylinder is equipped with a head 24 provided with a port 26 for delivering hydraulic fluid under pressure from chamber 28 at the front of the piston.

The piston has a cylindrical, skirt-like side wall 32 complementally fitting the inside diameter of the cylinder. The piston is hollow, to reduce weight and enlarge the volume of the chamber for gas behind the piston. To assure straight linear movement of the piston, thereby to avoid canting likely to cause uneven piston wear, the side wall of the piston is provided with at least a pair of Teflon plastic guides or wear rings 34 and 36 snugly fitting a pair of retainer grooves.

Figure 4:
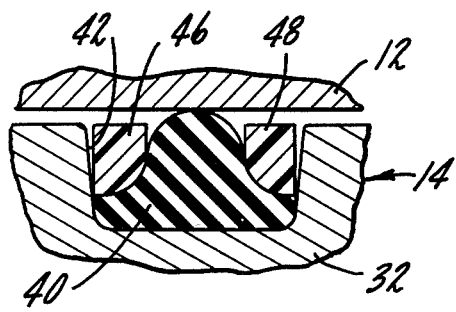
FIG. 4 is a fragmentary detail of the piston, in section.

To effectively separate and isolate the two chambers so there will be little leakage, the side wall of the piston is equipped with a pair of seal assemblies between the wear rings, although there may be circumstances where one seal will suffice. As shown in FIG. 4, each seal is in the form of a ring of elastomer 40 which in cross section is substantially T-shaped with the leg of the T positioned radially outward to engage the inside diameter of the cylinder. The cross arm of the T snugly fits the bottom of its seal groove 42, FIG. 4.

The space in the seal groove 42 on each side of the seal, not filled by the leg of the seal, is occupied by a complemental seal constrainer, 46 and 48 respectively, preferably of Teflon plastic. These constrainers support or buttress the leg of the seal T so it will not bend appreciably in one direction and then the other when the piston is actuated. If the seal is repeatedly bent back and forth it will sooner fail because of fatigue.

Figures 2, 3:
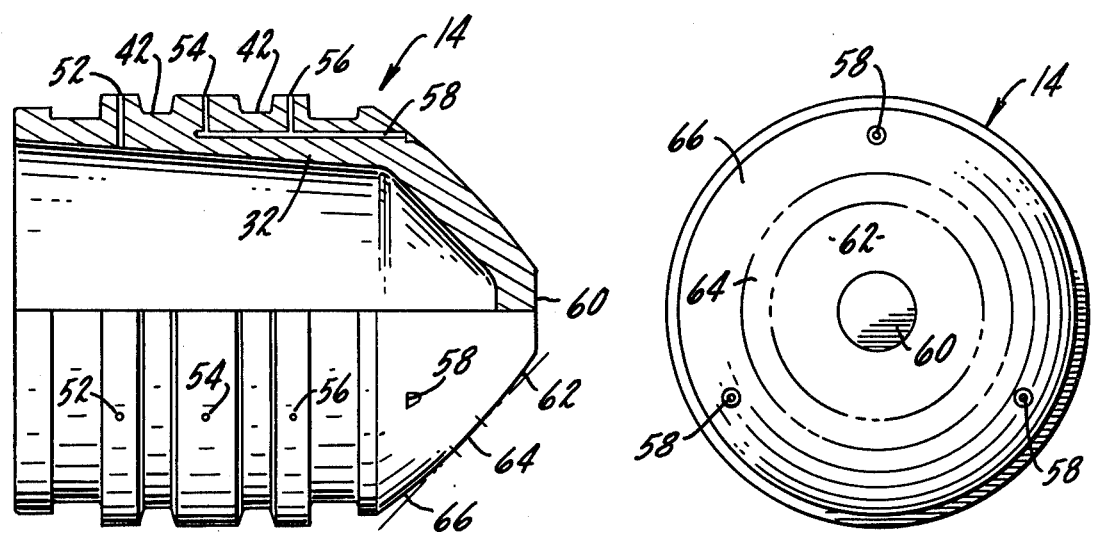
FIG. 2 is an enlarged detail of the accumulator piston.
FIG. 3 is an end view of the piston.

Pressure on opposite sides of the seals (two seals, as shown) is equalized by porting 52, 54, and 56. Port 52 communicates with the piston recess as shown in FIG. 2; ports 54 and 56 communicate with a drilled passage 58 in the piston side wall which extends to the front wall of the piston.

The front wall or working end of the piston is of compound geometry. It has a flat, blunt surface 60 proximal to the delivery port 26. Surface 60 is centered on the axis of the piston.

The portion of the piston front wall immediately surrounding surface 60 is a spherical section 62, followed by a chordal section 64 (no radius) and then finally a second spherical section 66 on the same radius as the first spherical section. Thus, the two spherical sections 62 and 66, each having the same radius, are separated by the chordal section. The terms "spherical section" and "chordal section" are accepted terms of geometry for designating the surfaces 62, 66 and 64 respectively. The surface represented by the chordal section 64 may also be aptly termed frusto-conical.

The end wall 68 of the cylinder corresponding to the delivery port 26 is concave, sloped substantially at the same angle (45°) as the chordal section 64 of the piston constituting a piston stop, that is, the forward movement of the piston is stopped by the chordal section nesting against the concave end wall 68. Since the adjacent spherical sections of the piston are in effect relieved, there is a lessened tendency for the piston to wear or stick when it engages the end wall 68, compared to a fully complementary fit of the piston front wall to end wall 68; also, there need be no concern about perfect machining since the chordal section is not of great or expansive area and accordingly the piston has a tendency easily to "wear in" as the saying goes.

The primary reason for sloping the opposed piston and cylinder surfaces is to enable dirt to be swept or chased from chamber 28 and out the delivery port 26 compared to a virtual impossibility of accomplishing this when the end walls are in planes substantially normal to the axis of the cylinder.

The present invention was prompted by a long felt need. We searched for over two years to find an accumulator which would meet our requirements; indeed we installed and tested several of them in a railroad classification yard but found wholly unreliable performance under the severe service conditions involved: they leaked, the piston wear was uneven and we found piston scoring due to trapped dirt particles.

Two of the present accumulators, after testing for an entire month (from the 8th day of one month to the 8th of the next) have each gone through 53,362 cycles with no loss of pressure on one (395 psig at the start and 395 psig after 53,652 cycles) and a loss of only 10 psig on the other.

We claim:

1. In an accumulator comprising a cylinder having a delivery port at one end for delivering hydraulic fluid under pressure and having an opening at the opposite end enabling a pressurizing gas to be admitted to the cylinder, a piston having a cylindrical side wall complementally fitting the inside diameter of the cylinder and having an end wall, facing the delivery port, comprising two spherical zones having substantially the same radius separated by a chordal surface having no radius surface, and the cylinder having a concave end wall, at the delivery end of the cylinder, with a slope substantially complemental to said chordal surface and constituting complemental stop for said surface of the piston, said spherical zones serving to sweep dirt past said concave end wall and out the delivery port.

2. An accumulator according to claim 1 in which the piston side wall supports two spaced wear rings engaging the inside diameter of the cylinder, a seal assembly supported by the piston between the wear rings, said seal assembly comprising a T-shaped ring of elastomer with the cross arm of the T seated in a seal groove formed in the piston and with the leg of the T pointing radially outward in engagement with the inside diameter of the cylinder, the leg of the T only partly filling said seal groove, and a pair of constrainer rings complementally filling the spaces, respectively, at the sides of the seal groove not occupied by said leg, said constrainer rings buttressing the sides of the elastomer leg to support the elastomer seal against appreciable bending in the course of piston movement inside the cylinder.

3. an accumulator according to claim 2 in which the wear rings and constrainer rings are each of Teflon plastic.

* * * * *